June 12, 1962 R. P. DUMM 3,038,693
SEAT ADJUSTMENT FOR BALL VALVES WITH ROTATABLE RING
Filed Aug. 4, 1960

INVENTOR.
ROBERT P. DUMM,
BY
ATTORNEY.

3,038,693
SEAT ADJUSTMENT FOR BALL VALVES WITH ROTATABLE RING
Robert P. Dumm, Long Beach, Calif., assignor to Pacific Valves, Inc., Long Beach, Calif., a corporation of California
Filed Aug. 4, 1960, Ser. No. 46,607
6 Claims. (Cl. 251—171)

An object of my invention is to provide a novel seat adjustment for ball valves of the character stated, in which an adjusting ring bearing against the valve seat can be caused to press against that seat when a make-up bolt is manually rotated.

Still another object of my invention is to provide a novel seat adjustment for ball valves of the character stated, in which the make-up bolt is positioned within the body of the valve, but which can be reached for purposes of adjustment by removing the top cover plate of the valve.

Still another object of my invention is to provide a novel seat adjustment for ball valves of the character stated, in which the seat can be accurately adjusted to fit the contours of the ball valve and, further, which will retain that adjustment until further corrective adjustment is required, at which time the make-up bolt can be manually rotated to effect that adjustment.

Other objects, advantages and features of invention may appear from the accompanying drawing, the subjoined detailed description and the appended claims.

Figure 1:
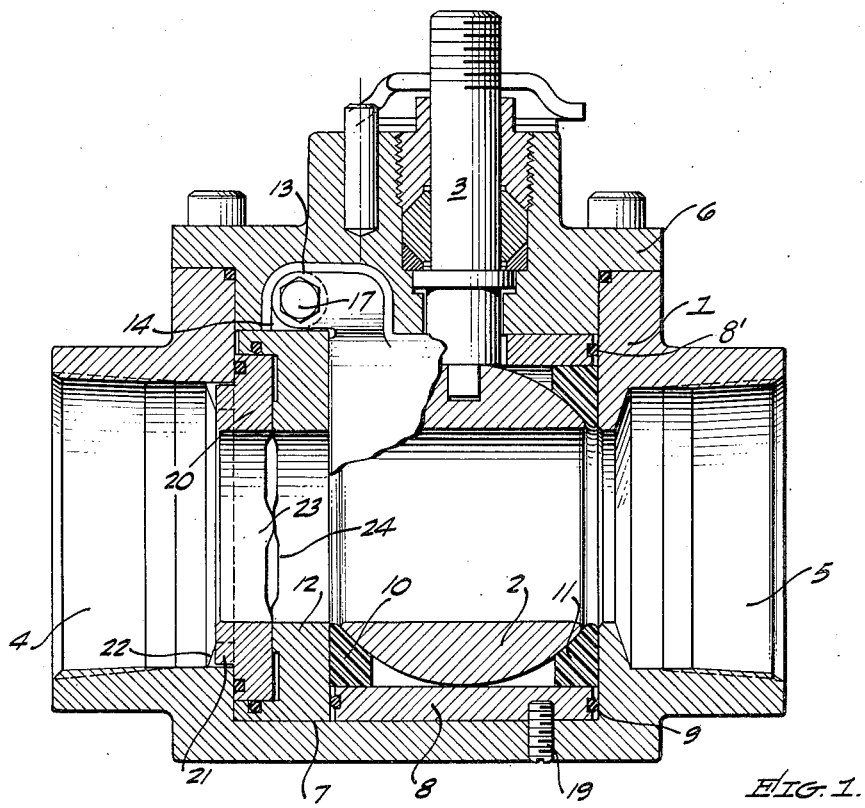
FIGURE 1 is a vertical sectional view of my seat adjustment for ball valves.
Figure 2:
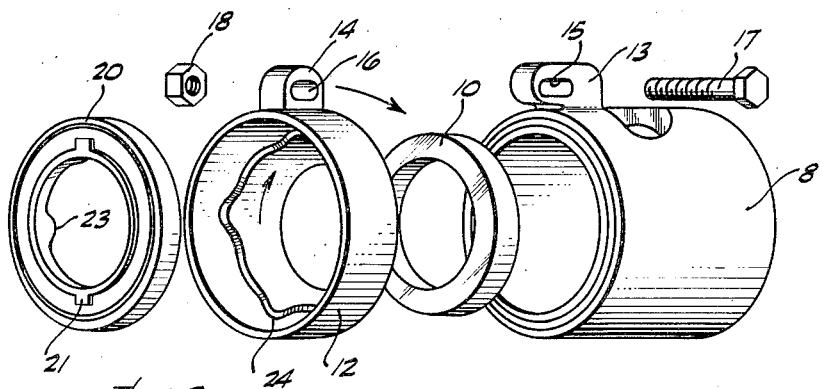
FIGURE 2 is an exploded view of the seat adjustment mechanism.

Referring more particularly to the drawing, the numeral 1 indicates the valve body in which the ball 2 is rotatably mounted. The ball 2 is suitably attached to a manually rotatable stem 3 in the usual and well known manner, and by means of this stem the ball is rotated to the desired open or closed position in the body 1. The body 1 includes an intake port 4 and an outlet port 5 through which the fluid passes. The valve may be of the top entry type, although this is not necessarily so, but if the top entry type is used then a cover plate 6 is bolted to the top of the body 1, and when the cover plate is removed access is obtained to the ball 2 and the structure adjacent thereto, as will be subsequently described. A cylinder 7 is formed within the body 1 and the ball 2 is positioned within this cylinder, as shown in FIG. 1.

A sleeve 8 is mounted within the cylinder 7 and one face of this sleeve has a packing ring 8' which butts against a shoulder 9 in the body 1 of the valve to prevent more than a limited movement of the sleeve in one direction. A pair of spaced seats 10 and 11 are mounted within the sleeve 8, and also within the cylinder 7 of the valve, and these seats bear against each side of the ball 2 for the purpose of sealing that ball against leakage, all of which is usual and well known in the art. The seat 11 also rests against the shoulder 9 of the body 1 for the purpose of limiting the movement of this seat in one direction.

An adjusting ring 12 is rotatably mounted within the cylinder 7 and this ring bears against the outer face of the packing 10. Thus when the ring 12 is moved inwardly against the packing 10, this packing will press against the ball 2, and also will slightly shift that ball against the packing 12 to securely seal the ball against leakage. Also, if desired, the width of the sleeve 8 can be accurately machined, so that the compressive action of the seats 10 and 11 against the ball 2 will be accomplished when the ring 12 engages one outer face of the sleeve 8.

The adjusting ring 12 is partially rotated relative to the sleeve 8 in the following manner: A finger 13 is formed on the upper part of the sleeve 8. A lug 14 is integrally formed of the upper part of the adjusting ring 12. The finger 13 is provided with an elongated hole 15 therethrough, and the lug 14 is formed with an elongated hole 16 extending therethrough. A bolt 17 extends through the holes 15—16 and screws into a nut 18 so that when this bolt is rotated the adjusting ring 12 will be partially rotated relative to the sleeve 8. The sleeve 8 is held against rotation within the body 1 by a suitable means, such as the set screw 19. Thus, since the sleeve 8 is nonrotatable in the body 1, adjustment of the bolt 17 will cause the adjusting ring 12 to rotate relative to the sleeve 8.

To cam the adjusting ring 12 either inwardly or outwardly relative to the seat 10, a camming ring 20 is arranged within the cylinder 7 and adjacent to the outer face of the adjusting ring 12. The camming ring 20 is held against rotation within the body 1 of the valve by means of the lugs 21 which extend into complementary grooves 22 formed within the body 1 of the valve. The ring 20 is formed with a cam surface 23 and the adjusting ring 12 is provided with a complementary cam surface 24 which bears against the cam 23. It will thus be evident that relative rotation between the adjusting ring 12 and the camming ring 20 will press the adjusting ring 12 inwardly against the packing 10 to seat that packing against the ball 2. When the valve is initially assembled the camming ring 20 is rotated in the cylinder 7, so that the cam surfaces 23 and 24 are properly arranged relative to each other and ready for further adjustment on rotation of the ring 12, and further with the lugs and grooves fitting together.

In operation:

The sleeve 8, the ball 2, and the seats 10—11 are all inserted in the cylinder 7 adjacent to the adjusting ring 12 and the camming ring 20, which have been previously positioned at one end of the cylinder 7. The bolt 17 is now threaded through the elongated slots 15 and 16 and the nut 18 is screwed onto the end of the bolt. Rotation of the bolt 17 will now cause the adjusting ring 12 to rotate relative to the camming ring 20, and also relative to the sleeve 8. The cam surfaces 23—24 will push the adjusting ring 12 along the longitudinal center line of the valve body 1 to press against the packing 10 and seat that packing against the outer surface of the ball 2. The ball 2 will also be slightly shifted to properly engage the packing 11, thus sealing the ball against leakage. The sleeve 8 can move endwise due to compression of the packing 8'.

Having described my invention, I claim.

1. A ball valve including a body having an inlet, an outlet and a cylinder therein, a ball rotatably mounted in said cylinder in the body, a sleeve, means nonrotatably mounting said sleeve in the cylinder, seats positioned within the sleeve and bearing against said ball on the sides adjacent the inlet and outlet, an adjusting ring, means rotatably mounting said adjusting ring in the body, one face of said adjusting ring bearing against one of said seats, a bolt extending between said sleeve and the adjusting ring and operatively connected thereto, to rotate the adjusting ring relative to the sleeve, and cam means in the body and engaged by the adjusting ring to move the adjusting ring against the seat on rotation of the adjusting ring.

2. A ball valve including a body having an inlet, an outlet and a cylinder therein, a ball rotatably mounted in said cylinder in the body, a sleeve, means nonrotatably mounting said sleeve in the cylinder, seats positioned within the sleeve and bearing against said ball on the sides adjacent the inlet and outlet, an adjusting ring, means rotatably mounting said adjusting ring in the body, one face of said adjusting ring bearing against one of said seats, a bolt extending between said sleeve and the adjusting ring and operatively connected thereto to rotate the adjusting ring relative to the sleeve, a camming ring, means nonrotatably mounting the camming ring in the body, cam means on the camming ring, cam means on the adjusting ring engaging the cam means on the camming ring to move the adjusting ring against the seat on rotation of the adjusting ring.

3. A ball valve including a body having an inlet, an outlet and a cylinder therein, said body having an intake and an outlet port therein and a cylinder arranged between said ports, a sleeve, means nonrotatably mounting said sleeve in the cylinder, a ball rotatably mounted within the sleeve, seats positioned within the sleeve and bearing against the ball, an adjusting ring, means rotatably mounting said adjusting ring in the body, one face of said adjusting ring bearing against one of said seats, a bolt extending between said sleeve and the adjusting ring to rotate the adjusting ring relative to the sleeve, and cam means engaged by the adjusting ring to move the adjusting ring against the seat on rotation of the adjusting ring.

4. A ball valve including a body having an inlet, an outlet and cylinder therein, said body having an intake and an outlet port therein and a cylinder arranged between said ports, a sleeve, means nonrotatably mounting said sleeve in the cylinder, a ball rotatably mounted within the sleeve, seats positioned within the sleeve and bearing against the ball, an adjusting ring, means rotatably mounting said adjusting ring in the body, one face of said adjusting ring bearing against one of said seats, a bolt extending between said sleeve and the adjusting ring to rotate the adjusting ring relative to the sleeve, a camming ring, means nonrotatably mounting the camming ring in the body, cam means on the camming ring, cam means on the adjusting ring engaging the cam means on the camming ring to move the adjusting ring against the seat on rotation of the adjusting ring.

5. A ball valve including a body having an inlet, an outlet and a cylinder therein, a ball rotatably mounted in said cylinder in the body, a sleeve, means nonrotatably mounting said sleeve in the cylinder, seats positioned within the sleeve and bearing against said ball on the sides adjacent the inlet and outlet, an adjusting ring, means rotatably mounting said adjusting ring in the body, one face of said adjusting ring bearing against one of said seats, a finger on said sleeve, a lug on the adjusting ring, a bolt extending through the finger and lug to rotate the adjusting ring relative to said sleeve on rotation of the bolt, and cam means engaged by the adjusting ring to move the adjusting ring against the seat on rotation of the adjusting ring.

6. A ball valve including a body having an inlet, an outlet and a cylinder therein, a ball rotatably mounted in said cylinder in the body, a sleeve, means nonrotatably mounting said sleeve in the cylinder, seats positioned within the sleeve and bearing against said ball on the sides adjacent the inlet and outlet, an adjusting ring, means rotatably mounting said adjusting ring in the body, one face of said adjusting ring bearing against one of said seats, a finger on said sleeve, a lug on the adjusting ring, a bolt extending through the finger and lug to rotate the adjusting ring relative to said sleeve on rotation of the bolt, a camming ring, means nonrotatably mounting the camming ring in the body, cam means on the camming ring, cam means on the adjusting ring engaging the cam means on the camming ring to move the adjusting ring against the seat on rotation of the adjusting ring.

References Cited in the file of this patent

UNITED STATES PATENTS

| | | |
|---|---|---|
| 712,350 | Williamson | Oct. 28, 1902 |
| 1,442,204 | Wilson | Jan. 16, 1923 |
| 1,599,168 | Duncan | Sept. 7, 1926 |
| 1,738,450 | Ryan | Dec. 3, 1929 |
| 1,931,797 | Howard | Oct. 24, 1933 |
| 2,035,548 | Johnson | Mar. 31, 1936 |
| 2,639,883 | Smith | May 26, 1953 |
| 2,734,715 | Knox | Feb. 14, 1956 |